(12) United States Patent
Chen et al.

(10) Patent No.: US 10,818,269 B2
(45) Date of Patent: Oct. 27, 2020

(54) METHOD FOR ADJUSTING DISPLAY IMAGE CONTRAST, DISPLAY AND READABLE STORAGE MEDIUM

(71) Applicant: SHENZHEN TCL NEW TECHNOLOGY CO., LTD., Shenzhen (CN)

(72) Inventors: Yixin Chen, Shenzhen (CN); Renli Xie, Shenzhen (CN)

(73) Assignee: SHENZHEN TCL NEW TECHNOLOGY CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/610,643

(22) PCT Filed: Jun. 29, 2018

(86) PCT No.: PCT/CN2018/093745
§ 371 (c)(1),
(2) Date: Nov. 4, 2019

(87) PCT Pub. No.: WO2019/105034
PCT Pub. Date: Jun. 6, 2019

(65) Prior Publication Data
US 2020/0066230 A1     Feb. 27, 2020

(30) Foreign Application Priority Data
Nov. 30, 2017   (CN) .......................... 2017 1 1257616

(51) Int. Cl.
*G09G 3/36*   (2006.01)
*G09G 5/10*   (2006.01)
*G06T 5/40*   (2006.01)

(52) U.S. Cl.
CPC .................. *G09G 5/10* (2013.01); *G06T 5/40* (2013.01); *G09G 2320/066* (2013.01); *G09G 2320/0626* (2013.01)

(58) Field of Classification Search
CPC .................................................. G09G 2320/066
See application file for complete search history.

(56) References Cited

U.S. PATENT DOCUMENTS

| 5,808,697 A | 9/1998 | Fujimura et al. |
| 2006/0238485 A1* | 10/2006 | Yang .................... G09G 3/3406 345/102 |

(Continued)

FOREIGN PATENT DOCUMENTS

| CN | 1237850 A | 12/1999 |
| CN | 101083044 A | 12/2007 |

(Continued)

OTHER PUBLICATIONS

International Search Report, dated Aug. 24, 2018, for Shenzhen TCL New Technology Co., Ltd, International Application No. PCT/CN2018/093745, Filed Jun. 29, 2018.

(Continued)

*Primary Examiner* — Roy P Rabindranath
(74) *Attorney, Agent, or Firm* — Law Offices of Albert Wai-Kit Chan, PLLC (57) ABSTRACT

The present disclosure provides a method for adjusting display image contrast, which includes the following operations: in response to receiving an image signal, acquiring an image to be displayed and metadata according to the image signal, and calculating a signal amplitude corresponding to each pixel of the image to be displayed; generating a histogram showing a distribution of the signal amplitude according to each of the signal amplitudes, and acquiring display information and a backlight adjustment parameter of the image to be displayed according to the histogram;

(Continued)

generating a signal adjustment function according to the display information, the backlight adjustment parameter, and the metadata, and adjusting the signal amplitude of each of the pixels according to the signal adjustment function to adjust a contrast of the image to be displayed. The present disclosure further provides a display and a readable storage medium. The cost of improving the display image contrast of the present application is low.

17 Claims, 3 Drawing Sheets

(56) References Cited

U.S. PATENT DOCUMENTS

| | | |
|---|---|---|
| 2015/0213582 A1 | 7/2015 | Kim |
| 2017/0061591 A1* | 3/2017 | Park .................. G06T 5/007 |

FOREIGN PATENT DOCUMENTS

| | | |
|---|---|---|
| CN | 101093290 A | 12/2007 |
| CN | 101340509 A | 1/2009 |
| CN | 107293265 A | 10/2017 |
| CN | 107948554 A | 4/2018 |

OTHER PUBLICATIONS

Written Opinion, dated Aug. 24, 2018, for Shenzhen TCL New Technology Co., Ltd, International Application No. PCT/CN2018/093745, Filed Jun. 29, 2018.

Chinese Office Action, dated May 6, 2020, for Shenzhen TCL New Technology Co., Ltd., Chinese Application No. 201711257616.7, filed Nov. 30, 2017.

* cited by examiner

METHOD FOR ADJUSTING DISPLAY IMAGE CONTRAST, DISPLAY AND READABLE STORAGE MEDIUM

FIELD

The present disclosure relates to the field of display technology, in particular to a method for adjusting display image contrast, a display and a readable storage medium.

BACKGROUND

Improvement of display image contrast has always been an important research direction of many display manufacturers, which is beneficial to significantly improve the image quality of the display, and makes the picture layered better and the stereoscopic effect deeper.

In the prior art, the improvement of the display image contrast is generally performed by increasing the luminance of the display screen, which has certain requirements on the display and increases the production cost of the display, namely, the cost of improving the display image contrast is high.

SUMMARY

The main purpose of the present disclosure is to provide a method for adjusting display image contrast, a display and a readable storage medium, aiming at solving the problem of high cost of improving the display image contrast.

To achieve the above purpose, the present disclosure provides a method for adjusting display image contrast, including the following operations:

in response to receiving an image signal, acquiring an image to be displayed and metadata according to the image signal, and calculating a signal amplitude corresponding to each pixel of the image to be displayed;

generating a histogram showing a distribution of the signal amplitude according to each of the signal amplitudes, and acquiring display information and a backlight adjustment parameter of the display image to be displayed according to the histogram; and generating a signal adjustment function according to the display information, the backlight adjustment parameter, and the metadata, and adjusting the signal amplitude of each of the pixels according to the signal adjustment function to adjust a contrast of the image to be displayed.

Optionally, the operation of acquiring display information and a backlight adjustment parameter of the image to be displayed according to the histogram includes:

calculating an average picture level, a minimum signal amplitude, and a dark-state segmentation point of the image to be displayed according to the histogram, and acquiring distribution information of the signal amplitude according to the histogram;

determining the display information of the image to be displayed according to the distribution information of the signal amplitude and the dark-state segmentation point, and the display information includes a distribution feature and an image type of the image to be displayed;

determining an average picture level to be processed according to the distribution information of the signal amplitude, the dark-state segmentation point, and the display information, and calculating a minimum signal amplitude to be processed according to the average picture level to be processed, the minimum signal amplitude, and the dark-state segmentation point; and calculating the backlight adjustment parameter according to the parameters to be processed, the average picture level to be processed and the minimum signal amplitude to be processed.

Optionally, the operation of calculating an average picture level of the image to be displayed according to the histogram includes:

determining a parameter range in which a preset percentage of the signal amplitudes are located in the histogram, and taking an upper limit value of the parameter range as an average picture level to be calculated;

calculating an expected value of the signal amplitude below the upper limit value in the histogram; and acquiring a mapping relationship among the average picture level to be calculated, the expected value, and the average picture level, and calculating the average picture level according to the mapping relationship, the average picture level to be calculated, and the expected value.

Optionally, the operation of generating a signal adjustment function according to the display information, the backlight adjustment parameter, and the metadata includes:

acquiring a maximum luminance, a minimum luminance, and a maximum signal amplitude corresponding to the image to be displayed according to the metadata;

calculating a control parameter corresponding to the maximum luminance, the minimum luminance, and the maximum signal amplitude; and generating the signal adjustment function according to the display information, the average picture level to be processed, the minimum signal amplitude to be processed, the control parameter, and the backlight adjustment parameter.

Optionally, the method for adjusting display image contrast further includes:

in response to adjusting each of the signal amplitudes, displaying the image to be displayed according to each of the adjusted signal amplitudes.

Optionally, the method for adjusting display image contrast further includes:

in response to displaying the image to be displayed, adjusting a backlight luminance of the display image according to the backlight adjustment parameter.

To achieve the above purpose, the present disclosure further provides a display, including a processor, a memory, and a contrast adjustment program of a display image stored on the memory and executable on the processor, and the contrast adjustment program of the display image, when executed by the processor, implements the aforementioned operations of the method for adjusting display image contrast.

To achieve the above purpose, the present disclosure further provides a readable storage medium, on which stores a contrast adjustment program of the display image, and the contrast adjustment program of the display image, when executed by the processor, implements the aforementioned operations of the method for adjusting display image contrast.

The present disclosure provides a method for adjusting display image contrast, a display and a readable storage medium. In response to the display receiving an image signal, an image to be displayed and metadata corresponding to the image signal are acquired, and a signal amplitude corresponding to each pixel of the image to be displayed is calculated. A histogram showing a distribution of the signal amplitude according to each of the signal amplitudes is generated, and display information and a backlight adjustment parameter of the image to be displayed are acquired according to the histogram. A signal adjustment function is generated according to the display information, the backlight adjustment parameter, and the metadata, so that the signal amplitude of each of the pixels may be adjusted according to the signal adjustment function, thereby the purpose of adjusting a contrast of the image to be displayed is achieved. In the present disclosure, to achieve the purpose of improving the display image contrast, there's no need to improve a backlight luminance. The luminance of each of the pixels is adjusted by adjusting the signal amplitude of each of the pixels of the image to be displayed, which is adjusted by the signal adjustment function by the display. Namely, the method provided by the present disclosure has no specific requirements on the display, thereby the cost of improving display image contrast is low.

DETAILED DESCRIPTION OF THE EMBODIMENTS

It is understood that the specific embodiments described herein are merely illustrative of the disclosure and are not intended to be limited.

The main solution of the present disclosure is: in response to receiving an image signal, acquiring an image to be displayed and metadata according to the image signal, and calculating a signal amplitude corresponding to each pixel of the image to be displayed; generating a histogram showing a distribution of the signal amplitude according to each of the signal amplitudes, and acquiring display information and a backlight adjustment parameter of the image to be displayed according to the histogram; generating a signal adjustment function according to the display information, the backlight adjustment parameter, and the metadata, and adjusting the signal amplitude of each of the pixels according to the signal adjustment function to adjust a contrast of the image to be displayed.

In the prior art, the improvement of the display image contrast is generally performed by increasing the luminance of the display screen, which has certain requirements on the display and increases the production cost of the display, namely, the cost of improving the display image contrast is high.

To achieve the purpose of improving the display image contrast, there's no need to improve a backlight luminance. The present disclosure provides a solution that the luminance of each of the pixels is adjusted by adjusting the signal amplitude of each of the pixels of the image to be displayed, which is adjusted by the signal adjustment function by the display. Namely, the method provided by the present disclosure has no specific requirements on the display, thereby the cost of improving display image contrast is low.

Figure 1:
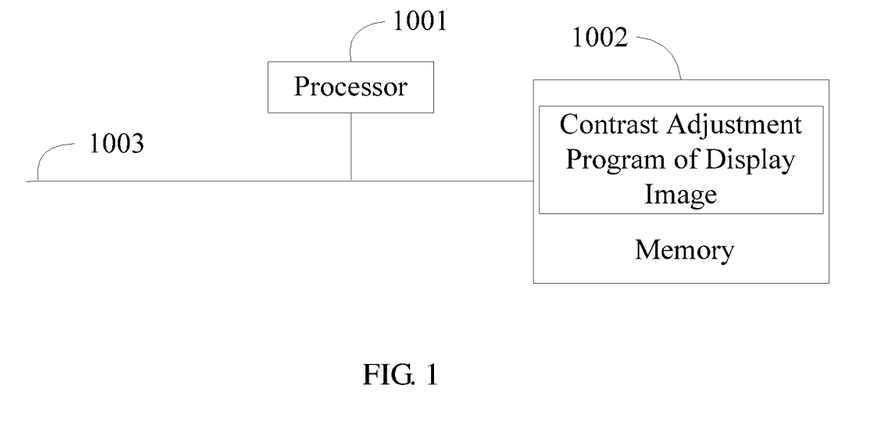
FIG. 1 is a schematic structural diagram of hardwares of a display according to an embodiment of the present disclosure.

As an implementation, the hardware structure of the above display may be as shown in FIG. 1.

Figure 2:
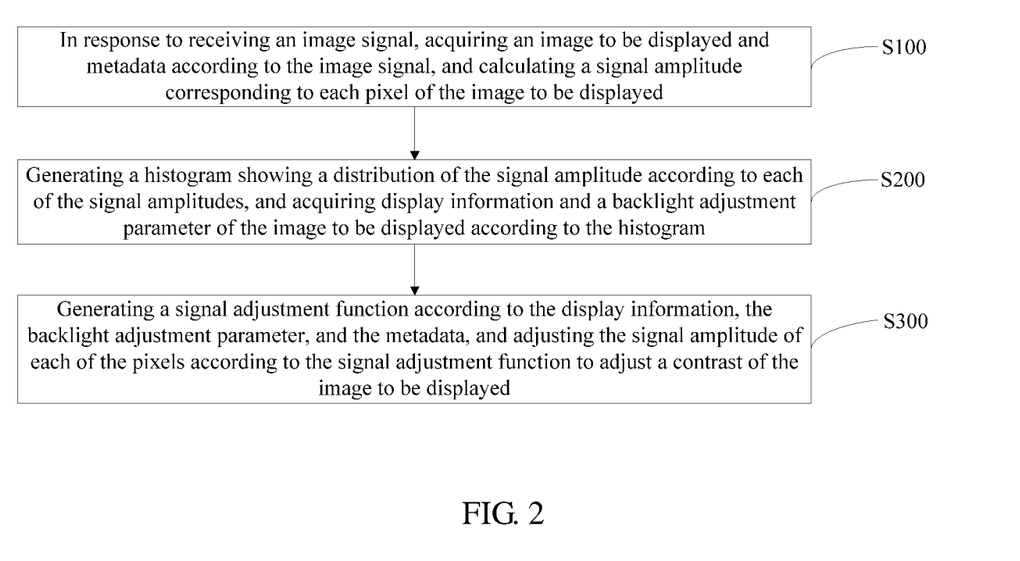
FIG. 2 is a schematic flow chart of a method for adjusting display image contrast according to a first embodiment of the present disclosure.

Referring to FIG. 2, the display may include a processor 1001, such as a CPU, a memory 1002, and a communication bus 1003. The communication bus 1003 is configured to implement connection communication among components in the frequency conversion air-cooled refrigerator. The memory 1002 may be a high speed Random Access Memory (RAM) or a stable Non-Volatile Memory (NVM), such as a magnetic disk memory. Optionally, the memory 1002 may further be a storage device independent of the aforementioned processor 1001. As shown in FIG. 2, a contrast adjustment program of a display image may be included in the memory 1002, which acts as a computer storage medium.

Among the hardwares in the display shown in FIG. 1, the processor 1001 may be configured to call the contrast adjustment program of a display image stored on the memory 1002, and perform the following operations:

in response to receiving an image signal, acquiring an image to be displayed and metadata according to the image signal, and calculating a signal amplitude corresponding to each pixel of the image to be displayed;

generating a histogram showing a distribution of the signal amplitude according to each of the signal amplitudes, and acquiring display information and a backlight adjustment parameter of the display image to be displayed according to the histogram; and generating a signal adjustment function according to the display information, the backlight adjustment parameter, and the metadata, and adjusting the signal amplitude of each of the pixels according to the signal adjustment function to adjust a contrast of the image to be displayed.

Further, in an embodiment, the processor 1001 may be configured to call the contrast adjustment program of a display image stored in the memory 1002, and perform the following operations:

calculating an average picture level, a minimum signal amplitude, and a dark-state segmentation point of the image to be displayed according to the histogram, and acquiring distribution information of the signal amplitude according to the histogram;

determining the display information of the image to be displayed according to the distribution information of the signal amplitude and the dark-state segmentation point, and the display information includes a distribution feature and an image type of the image to be displayed;

determining an average picture level to be processed according to the distribution information of the signal amplitude, the dark-state segmentation point, and the display information, and calculating a minimum signal amplitude to be processed according to the average picture level to be processed, the minimum signal amplitude, and the dark-state segmentation point; and calculating the backlight adjustment parameter according to the parameters to be processed, the average picture level to be processed and the minimum signal amplitude to be processed.

Further, in an embodiment, the processor 1001 may be configured to call the contrast adjustment program of a display image stored in the memory 1002, and perform the following operations:

determining a parameter range in which a preset percentage of the signal amplitudes are located in the histogram, and taking an upper limit value of the parameter range as an average picture level to be calculated;

calculating an expected value of the signal amplitude below the upper limit value in the histogram; and acquiring a mapping relationship among the average picture level to be calculated, the expected value, and the average picture level, and calculating the average picture level according to the mapping relationship, the average picture level to be calculated, and the expected value.

Further, in an embodiment, the processor 1001 may be configured to call the contrast adjustment program of a display image stored in the memory 1002, and perform the following operations:

acquiring a maximum luminance, a minimum luminance, and a maximum signal amplitude corresponding to the image to be displayed according to the metadata;

calculating a control parameter corresponding to the maximum luminance, the minimum luminance, and the maximum signal amplitude; and generating the signal adjustment function according to the display information, the average picture level to be processed, the minimum signal amplitude to be processed, the control parameter, and the backlight adjustment parameter.

Further, in an embodiment, the processor 1001 may be configured to call the contrast adjustment program of a display image stored in the memory 1002, and perform the following operation:

in response to adjusting each of the signal amplitudes, displaying the image to be displayed according to each of the adjusted signal amplitudes.

Further, in an embodiment, the processor 1001 may be configured to call the contrast adjustment program of a display image stored in the memory 1002, and perform the following operation:

in response to displaying the image to be displayed, adjusting a backlight luminance of the display image according to the backlight adjustment parameter.

According to the foregoing solution, in response to the display receiving an image signal, an image to be displayed and metadata corresponding to the image signal are acquired, and a signal amplitude corresponding to each pixel of the image to be displayed is calculated. A histogram showing a distribution of the signal amplitude according to each of the signal amplitudes is generated, and display information and a backlight adjustment parameter of the image to be displayed are acquired according to the histogram. A signal adjustment function is generated according to the display information, the backlight adjustment parameter, and the metadata, so that the signal amplitude of each of the pixels may be adjusted according to the signal adjustment function, thereby the purpose of adjusting a contrast of the image to be displayed is achieved. In the present disclosure, to achieve the purpose of improving the display image contrast, there's no need to improve a backlight luminance. The luminance of each of the pixels is adjusted by adjusting the signal amplitude of each of the pixels of the image to be displayed, which is adjusted by the signal adjustment function by the display. Namely, the method provided by the present disclosure has no specific requirements on the display, thereby the cost of improving display image contrast is low.

Based on the above hardware architecture, embodiments of the method for adjusting display image contrast of the present disclosure are proposed.

Referring to FIG. 2, FIG. 2 is a first embodiment of a method for adjusting display image contrast according to the present disclosure. The method for adjusting display image contrast includes the following operations.

S100. In response to receiving an image signal, acquiring an image to be displayed and metadata according to the image signal, and calculating a signal amplitude corresponding to each pixel of the image to be displayed.

In this embodiment, the execution body is a display, and the display may be a display component of a computer or a television. When an image signal is received by the display, an internal software of the display performs a series of encoding and decoding on the image signal to acquire a picture to be displayed, and then each pixel of the image to be displayed is determined according to pixels of the display. Each of the pixels has a corresponding gray scale, and a signal amplitude (pulse signal) of the pixel may be calculated by the display according to the gray scale, namely, the signal amplitude corresponding to each of the pixels of the picture to be displayed is acquired.

S200. Generating a histogram showing a distribution of the signal amplitude according to each of the signal amplitudes, and acquiring display information and a backlight adjustment parameter of the image to be displayed according to the histogram.

Each of the signal amplitudes is counted after being acquired by the display, so that a number of each of the signal amplitudes is acquired. Then a histogram showing a distribution of the signal amplitude is generated by taking the signal amplitude as the abscissa and the number of the signal amplitude as the ordinate.

Display information and a backlight adjustment parameter of the image to be displayed are acquired according to the histogram after the histogram is generated. Specifically, referring to FIG. 3, the operation S200 includes the following operations.

Figure 3:
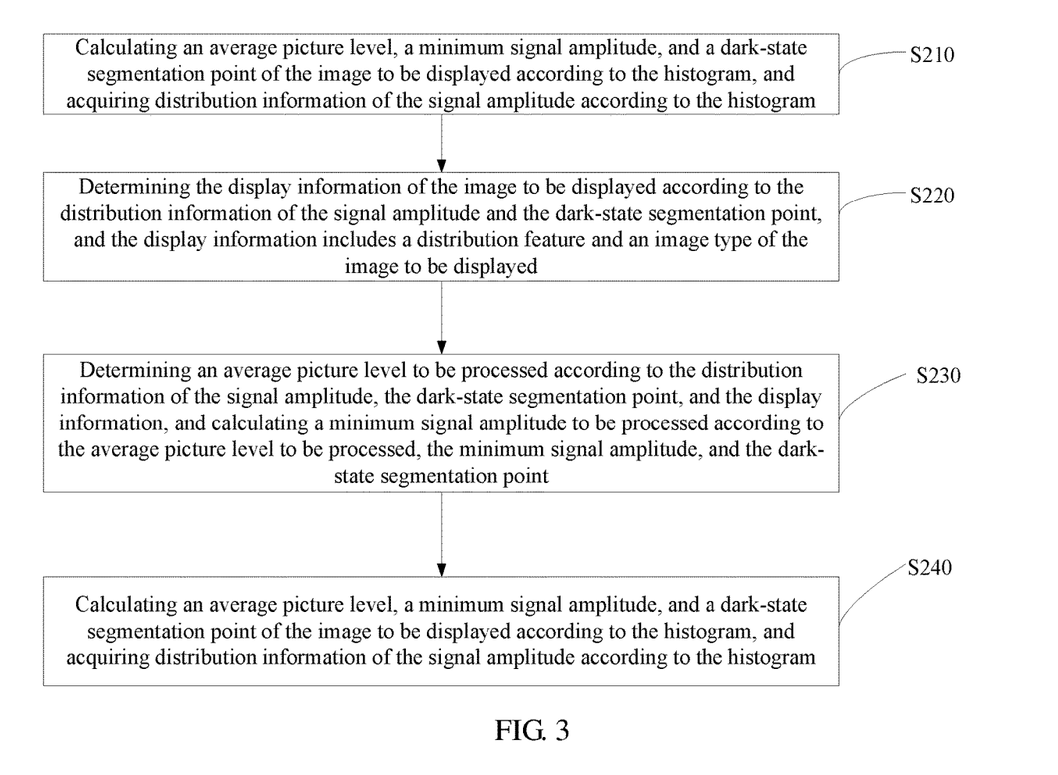
FIG. 3 is a schematic refining flow chart of an operation S200 in FIG. 2.

S210. Calculating an average picture level, a minimum signal amplitude, and a dark-state segmentation point of the image to be displayed according to the histogram, and acquiring distribution information of the signal amplitude according to the histogram.

The generated histogram shall be analyzed by a signal analysis module of the display. There are 256 signal amplitudes (corresponding to the gray scales) in the histogram. The adjacent 8 signal amplitudes are taken as one step by the analysis module, namely, all of the signal amplitudes are graded into 8 steps by the analysis module. Step 1 corresponds to gray scales 0 to 7, and so on, Step 32 corresponds to gray scales 248 to 255. The APL (Average Picture Level) may be calculated according to the value of n as APL=8*n, on condition that $Step_n+Step_{n+1}+ \ldots +Step_{32}>5\%$ and $Step_{n+1}+Step_{n+2}+ \ldots +Step_{32}<5\%$ are satisfied, where n is a positive number and less than 32. When more than 95% (which may be other values according to different image quality requirements) of the signals are within a certain gray scale range in an image, the gray scale is called the APL of the image. Certainly, the percentage in the above conditions may vary according to different image quality requirements of the display, which is not limited herein. In addition, the grading of the signal amplitudes is not limited to grading the adjacent 8 signal amplitudes into one step. The 16 adjacent signal amplitudes may also be graded into one step, and correspondingly, APL=16*n. Namely, all of the formulas for calculating the APL according to the above principle are within the protection scope of the present disclosure.

According to the above formula, a minimum amplitude value $In_{min}$ of the picture to be displayed may be calculated. For example, if the minimum signal amplitude of the picture to be displayed is at Step 8 of the histogram, then $In_{min}=8*8=64$.

A product of a percentage of the signals below a certain signal interval point and a value of the signal interval point is determined, when a proportion of the product is the closest to a certain value, the signal interval point is called the dark-state segmentation point. For example, the amplitude values of the respective signals are sequentially sorted, and the minimum signal amplitude of 8% is taken. If the signal amplitude corresponding to 8% ranges from 0 to 64, the dark-state segmentation point K is 64.

S220. Determining the display information of the image to be displayed according to the distribution information of the signal amplitude and the dark-state segmentation point, and the display information includes a distribution feature and an image type of the image to be displayed.

The signal amplitude distribution in the histogram is quantized to acquire corresponding quantized values after the histogram is generated. Then the quantized values are Gaussian filtered, and the filtered quantized values are fitted by least squares method and Bezier curve to acquire a curve C, namely the corresponding feature parameter C1(1:N). The fitting curve is classified to acquire display information HIST_c of the picture to be displayed, and the display information includes the distribution feature and the image type of the image to be displayed.

S230. Determining an average picture level to be processed according to the distribution information of the signal amplitude, the dark-state segmentation point, and the display information, and calculating a minimum signal amplitude to be processed according to the average picture level to be processed, the minimum signal amplitude, and the dark-state segmentation point.

A new parameter APL_c (average picture level to be processed) is acquired by querying a query table APL_LUT in the display (the query table is summarized and accumulated by many experiments, which may be continuously optimized during the image quality debugging process. Here, APL_LUT is a three-dimensional table. Firstly, values of the first dimension are determined by the dark-state segmentation point K, then values of the second dimension are determined by the classification information HIST_c of the histogram, and final parameter values are determined by the APL). Then a new parameter $In_{min\_c}$ (minimum signal amplitude to be processed) is acquired by querying a query table $In_{min}$_LUT according to the APL_c, the minimum signal amplitude $In_{min}$, and the dark-state segmentation point K (the query table is summarized and accumulated by many experiments, which may be continuously optimized during the image quality debugging process. Here, $In_{min}$_LUT is a three-dimensional table. Firstly, values of the first dimension are determined by the dark-state segmentation point K, then values of the second dimension are determined by APL_c, and final parameter values are determined by the minimum signal amplitude $In_{min}$).

S240. Calculating the backlight adjustment parameter according to the parameters to be processed, the average picture level to be processed and the minimum signal amplitude to be processed.

A first backlight adjustment parameter BL_1 is calculated according to the average picture level to be processed APL_c and the minimum signal amplitude $In_{min}$_c after the minimum signal amplitude to be processed $In_{min}$_c is acquired, which may be represented as L_1=F1(APL_c, $In_{min}$_c); a second backlight adjustment parameter BL_2 is determined according to HIST_c and BL_1, which may be represented as BL_2=F2(HIST_c, BL_1); finally, a third backlight adjustment parameter BL_3 is determined by BL_1 and BL_2, which is represented as: BL_3=F3(BL_1, BL_2).

S300. Generating a signal adjustment function according to the display information, the backlight adjustment parameter, and the metadata, and adjusting the signal amplitude of each of the pixels according to the signal adjustment function to adjust a contrast of the image to be displayed.

A signal adjustment function is generated according to the calculated backlight adjustment parameter, the display information, and the metadata. Specifically, referring to FIG. 4, the operation S300 includes the following operations.

Figure 4:
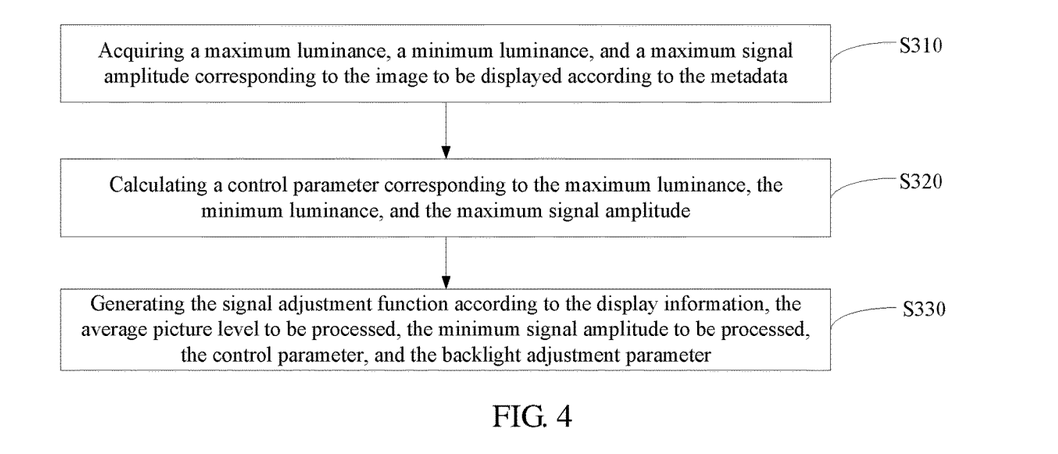
FIG. 4 is a schematic refining flow chart of an operation S300 in FIG. 2.

S310. Acquiring a maximum luminance, a minimum luminance, and a maximum signal amplitude corresponding to the image to be displayed according to the metadata.

The image signal carries the Master Display Max Luminance, the Master Display Min Luminance, and the maximum signal amplitude (Content Light Lv) of the image to be displayed after being processed by the display.

S320. Calculating a control parameter corresponding to the maximum luminance, the minimum luminance, and the maximum signal amplitude.

A return value of querying a query table MDMAX_LUT according to the maximum luminance is taken as a control parameter M1; a return value of querying a corresponding query table MDMIN_LUT according to the minimum luminance is taken as a control parameter M2; a return value of querying a corresponding query table CLL_LUT according to the maximum signal amplitude (Content Light Lv) of the image to be displayed is taken as a control parameter M3.

S330. Generating the signal adjustment function according to the display information, the average picture level to be processed, the minimum signal amplitude to be processed, the control parameter, and the backlight adjustment parameter.

A query operation is performed in a first three-dimensional matrix of the MAP_LUT according to the parameters APL_c, $In_{min}$_c, and BL_1, after M1, M2, and M3 are acquired, where a first dimension value is determined by the parameter APL_c, and a second dimension value is determined by the parameter $In_{min}$_c, and a final parameter A1 is determined by the parameter BL_1.

Then, a query operation is performed in a second three-dimensional matrix of the MAP_LUT according to the parameters HIST_c, BL_1, and BL_2, where the first dimension value is determined by the parameter HIST_c, the second dimension value is determined by the parameter BL_1, and the final parameter A2 is determined by the parameter BL_2.

Finally, the characteristic parameters C1(1:N) and M1, M2, and M3 of the above fitting curve are calculated to acquire parameters A3, A4, A5, and A6, which are represented as (A3, A4, A5, A6)=F5 (C1 (1:N), M1, M2, M3), namely the signal adjustment function.

The signal amplitude corresponding to each of the pixels of the image to be displayed may be adjusted according to the generated signal adjustment function, so as to adjust the luminance of each of the pixels, thereby the contrast of the image to be displayed is improved.

The image is displayed after the signal amplitude of each of the pixel is adjusted. Further, the backlight luminance of the display image may be adjusted according to the backlight adjustment parameter, thereby the contrast of the display image is further improved.

According to the solution provided in this embodiment, in response to the display receiving an image signal, an image to be displayed and metadata corresponding to the image signal are acquired, and a signal amplitude corresponding to each pixel of the image to be displayed is calculated. A histogram showing a distribution of the signal amplitude according to each of the signal amplitudes is generated, and display information and a backlight adjustment parameter of the image to be displayed are acquired according to the histogram. A signal adjustment function is generated according to the display information, the backlight adjustment parameter, and the metadata, so that the signal amplitude of each of the pixels may be adjusted according to the signal adjustment function, thereby the purpose of adjusting a contrast of the image to be displayed is achieved. In the present disclosure, to achieve the purpose of improving the display image contrast, there's no need to improve a backlight luminance. The luminance of each of the pixels is adjusted by adjusting the signal amplitude of each of the pixels of the image to be displayed, which is adjusted by the signal adjustment function by the display. Namely, the method provided by the present disclosure has no specific requirements on the display, thereby the cost of improving display image contrast is low.

Figure 5:
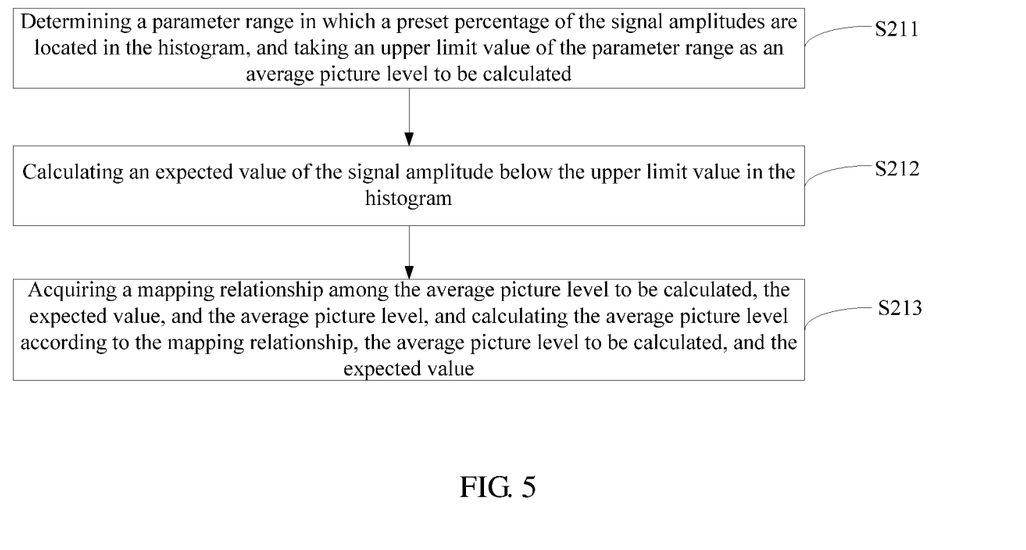
FIG. 5 is a schematic flow chart of a method for adjusting display image contrast according to a second embodiment of the present disclosure.

Referring to FIG. 5, FIG. 5 is a second embodiment of a method for adjusting display image contrast according to the present disclosure. Based on the foregoing embodiment, the operation S210 further includes the following operations.

S211. Determining a parameter range in which a preset percentage of the signal amplitudes are located in the histogram, and taking an upper limit value of the parameter range as an average picture level to be calculated.

S212. Calculating an expected value of the signal amplitude below the upper limit value in the histogram.

S213. Acquiring a mapping relationship among the average picture level to be calculated, the expected value, and the average picture level, and calculating the average picture level according to the mapping relationship, the average picture level to be calculated, and the expected value.

The parameter range in which a preset percentage of the signal amplitudes are located of the image to be displayed (the preset percentage is 95%) is determined. It should be noted that a lower limiting value of the parameter range is fixed to zero. Firstly an upper limit value of the parameter range is determined, for example, 95% of the signal amplitudes are in the range of 0 to 248, then the upper limit value is 248, and 248 is taken as the average picture level to be calculated APL_1, and then an expected value APL_2 of the signal amplitudes below 248 in the histogram is calculated. Then the APL is calculated according to the mapping relationship of the APL_1, the APL_2, and the APL, and the mapping relationship is represented as APL=$\alpha$*APL_1+$\beta$*APL_2, where $\alpha$ and $\beta$ may be adjusted according to actual conditions, so as to achieve the best effect.

In this embodiment, a technical solution that the average picture level is calculated according to the parameter range in which the preset percentage of the signal amplitudes are located is provided. The calculation methods for calculating the average picture level are enriched, thereby the signal adjustment function being accurately acquired by reasonably using the calculation method may be achieved.

The present disclosure further provides a display, which includes a processor, a memory, and a contrast adjustment program of a display image stored on the memory and executable on the processor, and the contrast adjustment program of the display image, when executed by the processor, implements the aforementioned operations of the method for adjusting display image contrast.

The present disclosure further provides a readable storage medium, on which stores a contrast adjustment program of the display image. The contrast adjustment program of the display image, when executed by the processor, implements the aforementioned operations of the method for adjusting display image contrast.

The serial numbers of the embodiments of the present disclosure are merely for the description, and do not represent the advantages and disadvantages of the embodiments.

It is to be understood that the terms "comprise", "include", or any other variants thereof, are intended to encompass a non-exclusive inclusion, such that a process, method, article, or device comprising a series of elements not only includes those elements, but also includes other elements that are not explicitly listed, or elements that are inherent to such a process, method, article, or device. An element defined by the phrase "comprising a . . . " does not exclude the presence of additional elements in the process, method, article, or device that comprises the element.

Through the description of the above embodiments, those skilled in the art can clearly understand that the foregoing embodiment method can be implemented by means of software plus a necessary general hardware platform, and of course, can also be through hardware, but in many cases, the former is better. Based on such understanding, the technical solution of the present disclosure, which is essential or contributes to the prior art, may be embodied in the form of a software product stored in a storage medium (such as ROM/RAM, a disk, an optical disk) as described above, including a number of instructions for making a terminal device (which may be a mobile phone, a computer, a server, an air conditioner, or a network device, etc.) to perform the methods described in the various embodiments of the present disclosure.

The above are only preferred embodiments of the present disclosure, and is not intended to limit the scope of the patent disclosure. Any equivalent structure or equivalent process transformation made by using the contents of this specification and attached drawings, or directly or indirectly used in other relevant technical fields, shall be included in the patent protection scope of this disclosure in the same way.

What is claimed is:

1. A method for adjusting display image contrast, comprising the following operations:
   in response to receiving an image signal, acquiring an image to be displayed and metadata according to the image signal, and calculating a signal amplitude corresponding to each pixel of the image to be displayed;
   generating a histogram showing a distribution of the signal amplitude according to each of the signal amplitudes, and acquiring display information and a backlight adjustment parameter of the display image to be displayed according to the histogram; and
   generating a signal adjustment function according to the display information, the backlight adjustment parameter, and the metadata, and adjusting the signal amplitude of each of the pixels according to the signal adjustment function to adjust a contrast of the image to be displayed;
   wherein the operation of acquiring display information and a backlight adjustment parameter of the image to be displayed according to the histogram comprises:
   calculating an average picture level, a minimum signal amplitude, and a dark-state segmentation point of the image to be displayed according to the histogram, and acquiring distribution information of the signal amplitude according to the histogram;
   determining the display information of the image to be displayed according to the distribution information of the signal amplitude and the dark-state segmentation point, wherein the display information comprises a distribution feature and an image type of the image to be displayed;

determining an average picture level to be processed according to the distribution information of the signal amplitude, the dark-state segmentation point, and the display information, and calculating the minimum signal amplitude to be processed according to the average picture level to be processed, the minimum signal amplitude, and the dark-state segmentation point; and calculating the backlight adjustment parameter according to the average picture level to be processed and the minimum signal amplitude to be processed.

2. The method for adjusting display image contrast of claim 1, wherein the operation of calculating an average picture level of the image to be displayed according to the histogram comprises:

determining a parameter range in which a preset percentage of the signal amplitudes are located in the histogram, and taking an upper limit value of the parameter range as an average picture level to be calculated;

calculating an expected value of the signal amplitude below the upper limit value in the histogram; and acquiring a mapping relationship among the average picture level to be calculated, the expected value, and the average picture level, and calculating the average picture level according to the mapping relationship, the average picture level to be calculated, and the expected value.

3. The method for adjusting display image contrast of claim 2, wherein the operation of generating a signal adjustment function according to the display information, the backlight adjustment parameter, and the metadata comprises:

acquiring a maximum luminance, a minimum luminance, and a maximum signal amplitude corresponding to the image to be displayed according to the metadata;

calculating a control parameter corresponding to the maximum luminance, the minimum luminance, and the maximum signal amplitude; and generating the signal adjustment function according to the display information, the average picture level to be processed, the minimum signal amplitude to be processed, the control parameter, and the backlight adjustment parameter.

4. The method for adjusting display image contrast of claim 1, further comprising:

in response to adjusting each of the signal amplitudes, displaying the image to be displayed according to each of the adjusted signal amplitudes.

5. The method for adjusting display image contrast of claim 4, further comprising:

in response to displaying the image to be displayed, adjusting a backlight luminance of the display image according to the backlight adjustment parameter.

6. The method for adjusting display image contrast of claim 1, wherein the operation of calculating a signal amplitude corresponding to each pixel of the image to be displayed comprises:

determining each of the pixels of the image to be displayed and gray scales corresponding to the pixels; and calculating the signal amplitude of the pixel according to the gray scale.

7. A display, comprising a processor, a memory, and a contrast adjustment program of a display image stored on the memory and executable on the processor, the contrast adjustment program of the display image, when executed by the processor, implements the following operations:

in response to receiving an image signal, acquiring an image to be displayed and metadata according to the image signal, and calculating a signal amplitude corresponding to each pixel of the image to be displayed;

generating a histogram showing a distribution of the signal amplitude according to each of the signal amplitudes, and acquiring display information and a backlight adjustment parameter of the display image to be displayed according to the histogram; and generating a signal adjustment function according to the display information, the backlight adjustment parameter, and the metadata, and adjusting the signal amplitude of each of the pixels according to the signal adjustment function to adjust a contrast of the image to be displayed;

wherein the operation of acquiring display information and a backlight adjustment parameter of the image to be displayed according to the histogram comprises:

calculating an average picture level, a minimum signal amplitude, and a dark-state segmentation point of the image to be displayed according to the histogram, and acquiring distribution information of the signal amplitude according to the histogram;

determining the display information of the image to be displayed according to the distribution information of the signal amplitude and the dark-state segmentation point, wherein the display information comprises a distribution feature and an image type of the image to be displayed;

determining an average picture level to be processed according to the distribution information of the signal amplitude, the dark-state segmentation point, and the display information, and calculating the minimum signal amplitude to be processed according to the average picture level to be processed, the minimum signal amplitude, and the dark-state segmentation point; and calculating the backlight adjustment parameter according to the average picture level to be processed and the minimum signal amplitude to be processed.

8. The display of claim 7, wherein the contrast adjustment program of the display image, when executed by the processor, implements the following operations:

determining, in the histogram, a parameter range in which a preset percentage of the signal amplitudes are located, and taking an upper limit value of the parameter range as an average picture level to be calculated;

calculating an expected value of the signal amplitude below the upper limit value in the histogram; and acquiring a mapping relationship among the average picture level to be calculated, the expected value, and the average picture level, and calculating the average picture level according to the mapping relationship, the average picture level to be calculated, and the expected value.

9. The display of claim 8, wherein the contrast adjustment program of the display image, when executed by the processor, implements the following operations:

acquiring a maximum luminance, a minimum luminance, and a maximum signal amplitude corresponding to the image to be displayed according to the metadata;

calculating a control parameter corresponding to the maximum luminance, the minimum luminance, and the maximum signal amplitude; and generating the signal adjustment function according to the display information, the average picture level to be processed, the minimum signal amplitude to be processed, the control parameter, and the backlight adjustment parameter.

10. The display of claim 7, wherein the contrast adjustment program of the display image, when executed by the processor, implements the following operation:
   in response to adjusting each of the signal amplitudes, displaying the image to be displayed according to each of the adjusted signal amplitudes.

11. The display of claim 10, wherein the contrast adjustment program of the display image, when executed by the processor, implements the following operation:
   in response to displaying the image to be displayed, adjusting a backlight luminance of the display image according to the backlight adjustment parameter.

12. The display of claim 7, wherein the contrast adjustment program of the display image, when executed by the processor, implements the following operations:
   determining each of the pixels of the image to be displayed and gray scales corresponding to the pixels; and
   calculating the signal amplitude of the pixel according to the gray scale.

13. A non-transitory computer readable storage medium, storing a contrast adjustment program of a display image, the contrast adjustment program of the display image, when executed by a processor, implementing following operations of a method for adjusting display image contrast:
   in response to receiving an image signal, acquiring an image to be displayed and metadata according to the image signal, and calculating a signal amplitude corresponding to each pixel of the image to be displayed;
   generating a histogram showing a distribution of the signal amplitude according to each of the signal amplitudes, and acquiring display information and a backlight adjustment parameter of the display image to be displayed according to the histogram; and
   generating a signal adjustment function according to the display information, the backlight adjustment parameter, and the metadata, and adjusting the signal amplitude of each of the pixels according to the signal adjustment function to adjust a contrast of the image to be displayed;
   wherein the operation of acquiring display information and a backlight adjustment parameter of the image to be displayed according to the histogram comprises:
   calculating an average picture level, a minimum signal amplitude, and a dark-state segmentation point of the image to be displayed according to the histogram, and acquiring distribution information of the signal amplitude according to the histogram;
   determining the display information of the image to be displayed according to the distribution information of the signal amplitude and the dark-state segmentation point, wherein the display information comprises a distribution feature and an image type of the image to be displayed;
   determining an average picture level to be processed according to the distribution information of the signal amplitude, the dark-state segmentation point, and the display information, and calculating the minimum signal amplitude to be processed according to the average picture level to be processed, the minimum signal amplitude, and the dark-state segmentation point; and
   calculating the backlight adjustment parameter according to the average picture level to be processed and the minimum signal amplitude to be processed.

14. The non-transitory computer readable storage medium of claim 13, wherein the operation of calculating an average picture level of the image to be displayed according to the histogram comprises:
   determining a parameter range in which a preset percentage of the signal amplitudes are located in the histogram, and taking an upper limit value of the parameter range as an average picture level to be calculated;
   calculating an expected value of the signal amplitude below the upper limit value in the histogram; and
   acquiring a mapping relationship among the average picture level to be calculated, the expected value, and the average picture level, and calculating the average picture level according to the mapping relationship, the average picture level to be calculated, and the expected value.

15. The non-transitory computer readable storage medium of claim 13, wherein the method for adjusting display image contrast further comprises:
   in response to adjusting each of the signal amplitudes, displaying the image to be displayed according to each of the adjusted signal amplitudes.

16. The non-transitory computer readable storage medium of claim 13, wherein the method for adjusting display image contrast further comprises:
   in response to displaying the image to be displayed, adjusting a backlight luminance of the display image according to the backlight adjustment parameter.

17. The non-transitory computer readable storage medium of claim 13, wherein the operation of calculating a signal amplitude corresponding to each pixel of the image to be displayed comprises:
   determining each of the pixels of the image to be displayed and gray scales corresponding to the pixels; and
   calculating the signal amplitude of the pixel according to the gray scale.

* * * * *